United States Patent Office 3,632,824
Patented Jan. 4, 1972

3,632,824
METHOD OF PRODUCING PALLADIUM-CARBON BOND COMPOUNDS
Peter Fitton, South Charleston, W. Va., and James Edward McKeon, Thornwood, N.Y., assignors to Union Carbide Corporation, New York, N.Y.
No Drawing. Filed Dec. 31, 1968, Ser. No. 788,337
Int. Cl. C07j 15/00
U.S. Cl. 260—429 R                      10 Claims

ABSTRACT OF THE DISCLOSURE

A method is disclosed for making reactive compounds of palladium containing palladium-carbon bonds by reacting palladium in the zero valent state with a halogen-carbon bond containing compound. The compounds have utility as intermediates and as catalysts.

---

This invention relates to new complexes of palladium (II) and the production thereof.

In one aspect, the invention concerns the method for formation of a carbon-palladium bond by reacting a compound having halogen-carbon bonds with a palladium(0) complex.

In another aspect, the invention concerns palladium (II) complexes formed from the reaction of a compound having halogen carbon bonds with a palladium(0) complex.

These and other aspects of the invention will be more fully understood from the following description.

More specifically, the invention relates to the production of carbon-metal bonds by reacting a palladium(0) compound with a compound having halogen-carbon bonds and the general Formula RX wherein R is selected from the group consisting of alkyl, cycloalkyl, aryl, aralkyl, alkaryl, acyl (including formyl), alkenyl when the carbon-carbon double bond is separated by at least one carbon atom from the carbon bearing the reactive group X (e.g., allyl, methallyl, etc.) and cyano, and X is selected from the group consisting of chlorine, bromine, fluorine, and iodine. The reactivity of RX in this reaction increases as the atomic weight of X increases, other things being equal. When X is Cl, Br, or I, RX reacts at practical rates under relatively mild conditions and these compounds are preferred on that account. The general reaction may be schematically represented as follows:

For example, if one employs tetrakis-(triphenylphosphine)palladium (0) and methyl iodide, the reaction and product may be represented as follows:

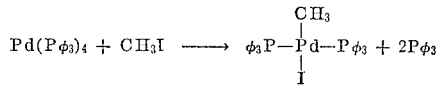

If one employs bi[bis(1,2-diphenylphosphino)ethane] palladium(0) the reaction may be depicted as follows:

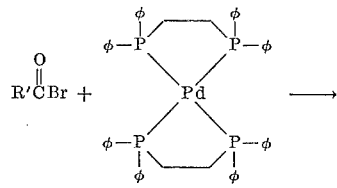

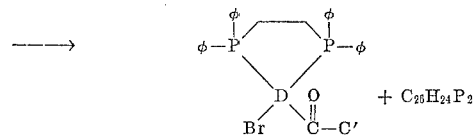

The palladium(0) complex used in this invention may be stabilized with phosphorous-containing ligands. The exact structure of the phosphorous-containing ligand is not critical. The only requirement is that the phosphorous-containing ligand be capable of stabilizing the palladium (0) species. The phosphorous containing ligands can be monodentate or bidentate. The monodentate ligands contain one phosphorous atom which can occupy a position in the coordination sphere of palladium. The bidentate ligands contain two phosphorous atoms which can occupy cis-positions in the coordination sphere of palladium. The number of phosphorous containing ligands occupying positions in the coordination sphere of palladium will of course depend upon whether monodentate or bidentate ligands are complexed with the palladium. One bidentate ligand is obviously the equivalent of two monodentate ligands. Generally, the palladium(0) is stabilized with the equivalent of four monodentate ligands. During the course of the reaction, there may exist intermediate palladium(0) complexes stabilized by the equivalent of two or three monodentate ligands. Complexes containing two stabilizing ligands per palladium atom (e.g., bis(triphenylphosphine) palaldium(0) may also be used.

Suitable stabilizing ligands are the tri(hydrocarbyl) phosphines containing from 3 to about 30 carbon atoms and preferably from about 6 to about 18 carbon atoms such as the tri-alkyl phosphines, triarylphosphines, and mixed alkyl-aryl phosphines. Examples of suitable stabilizing ligands are triphenylphosphine, tri-(p-tolyl)phosphine, tri(n-butyl)-phosphine, tri-(n-octyl)phosphine, diphenylmethylphosphine and the like. Bidentate phosphine ligands such as P,P,P',P'-tetraphenyl - 1,2-ethylene-diphosphine and the like may also be used. Corresponding compounds of arsenic are also useful but have no advantage over the more readily available phosphorous compounds.

Oxygen containing phosphorous ligands such as the trialkyl and triaryl phosphites can also be used though they are generally less effective than the simple phosphines.

Certain compounds such as simple trialkyl phosphines and triphenylphosphine are commercially available at relatively low cost and are preferred for this reason. Triphenylphosphine is less hazardous to handle in commercial operation and is preferred on that account.

The Pd(0) compound may be prepared in situ. That is, the reactive Pd(0) compound can be produced in the presence of RX and a stabilizing ligand. In this manner of carrying out the reaction, the less effective stabilizing ligands such as the phosphites may be used more effectively.

It is often convenient to prepare the Pd(0) compound separately and later react the Pd(0) compound so prepared with RX.

The following descriptions illustrate the preparation of a suitable Pd(0) compound. The stabilized palladium (0) compound can be prepared by reducing a compound of palladium(II) in the presence of at least a stoichiometric amount, and preferably an excess of the stabilizing ligand. Metal hydrides are convenient reducing agents. The products are stable in air for limited periods once they have been crystallized. For example, triphenylphosphine (83.84) grams was added to a solution of 92 grams of palladium nitrate in acetone (200 ml.). The reaction flask was immersed in cold water and a solution of 5 grams of sodium borohydride in 100 ml. of water was added dropwise with vigorous stirring. The product was filtered off and dissolved in hot benzene containing a small amount of triphenylphosphine. The benzene solution was concentrated and cooled until $[(C_6H_5)_3P]_4Pd$ crystallized; 41.65 g., 83% yield of greenish yellow crystals; M.P. 104–107° C. C, 14.8%; H, 5.17%.

R contains less than 50, preferably less than 30 carbon atoms. R groups containing less than 20 carbon atoms are particularly preferred. R, other than cyano, may contain other functional groups inert in the reaction such as carboxy, carboalkoxy, nitrile, amido, alkoxy, aryloxy, hydroxy and the like.

Examples of RX are: methyl chloride, methyl iodide, methyl bromide, allyl bromide, methallyl bromide, allyl chloride, methallyl chloride, acetyl chloride, ethyl chloroformate, phenyl iodide, phenyl chloride, benzyl chloride, cyanogen bromide, cyanogen chloride, 1,1-diethoxy-2-bromoethane, carbon tetrachloride, chloroform, dichloromethane, cyclohexyl iodide, 1-bromonaphthalene, 4-bromobutyric acid, 1-iodo-2-methoxyethane, iodo-oxatricyclooctane, 1-chloro-1-phenyl cyclohexane, bromocyclopentane, bromocyclobutane, chlorocyclooctane, methallyl fluoride, p-chlorobenzyl bromide, 3-chlorocyclohexane, benzoyl bromide, p-nitrobenzoyl chloride, stearoyl chloride, benzoyl fluoride, ethylchloroacetate, benzylchloroformate.

Reaction in general is most rapid when R is acyl, benzyl allyl or substituted allyl. When R is aryl somewhat slower rates are generally observed. Compounds where R is alkyl or cycloalkyl occupy an intermediate position. When there is more than one halogen atom in RX at sites of equal activity the halogen of highest molecular weight reacts most readily.

RX adds oxidatively across Pd(0) to give a compound of Pd(II). In the new compound R and X are generally mutually trans in the square plane of Pd(II). Cis complexes may be formed initially but when monodentate stabilizing ligands are used isomerization to the more stable trans compounds of Pd(II) can take place rapidly. When the original Pd(0) compound contained a cis-bidentate stabilizing ligand the product must have the cis-configuration.

These compounds of Pd(II) contain reactive palladium-carbon bonds and are thus useful intermediates in the arylation of olefins, in the preparation of aromatic acids by carbonylation; they are useful as active forms of catalysts for catalytic oxidation of methylbenzenes to useful benzyl derivatives, and are useful for polymerization of bicyclo [2.2.1] heptene and substituted bicycloheptenes without ring openings, that is to produce true poly(bicycloheptene).

The reaction is preferably carried out by reacting a stoichiometric amount or greater of the halogen-carbon bonded compound with the palladium(0) complex at room temperature. An inert atmosphere such as argon or nitrogen can be employed if desired. The reaction can be carried out between 0° C. or lower and 200° C. or higher, with a temperature range between room temperature and 150° C., preferred. Pressure is not narrowly critical.

If desired, mutual solvents for the reactants which are themselves inert in the reaction can be used. Typical solvents are aromatic hydrocarbons such as benzene and toluene, ethers such as diethyl ether and 1,2-diethoxyethane, hydrocarbons such as pentane, hexane, and heptane, aliphatic amides such as dimethyl formamide, dimethyl acetamide, diethyl formamide and diethylacetamide, tetramethyl urea, and esters such as ethyl acetate.

The products are generally crystalline solids. Soluble by-products may be removed by solvent extraction. The product residue may be used as is or further purified by recrystallization. Chromatography or other purification techniques may be used but are usually unnecessary.

The presence, in the products, of carbon-palladium bonds can be demonstrated by characteristic infrared and nuclear magnetic resonance absorptions. Presence of halogen is demonstrated by elemental analysis and, in the case of chlorine, by characteristic absorptions in the far infrared. The configuration of the compounds has been determined to be trans in all those examined except the product from bi[bis(1,2-diphenylphosphino)ethane]palladium(0) which must be cis.

The following examples are illustrative of the invention.

EXAMPLE 1

Methyl iodide (0.004 mole in benzene (5 ml.) was added dropwise, with stirring, to a suspension of $$[(C_6H_5)_3P]_4Pd$$

(0.002 mole) in degassed benzene (50 ml.). The mixture was stirred for 1 hour at room temperature after which the solvent was removed under vacuum on a Büchi Roto-Vaptor. The solid residues were titurated with ether. The remaining solid was recrystallized from methylene chloride-hexane to give the crystalline product: M.P. 151–4° C. (d.) Infrared and nuclear magnetic resonance spectra and elemental analysis (Found: C, 57.65; H, 4.37; P, 7.98; Pd, 13.03; Halogen, 13.66) were consistent with the structure

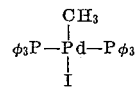

EXAMPLE 2

Acetyl chloride (0.004 mole) in benzene (5 ml.) was added dropwise, with stirring, to a suspension of $$[(C_6H_5)_3P]_4Pd$$

(0.002 mole) in degassed benzene (50 ml.).

The mixture was stirred for 1 hour at room temperature after which the solvent was removed under vacuum on a Büchi Roto-Vaptor. The solid residue was triturated with ether. The remaining solid was recrystallized from methylene chloride-hexane to give the crystalline product; M.P. 166–72° C. (d.). Infrared and nuclear magnetic resonance spectra and elemental analysis (Found (percent): C, 64.72; H, 4.94; P, 8.68; Pd, 14.5; Halogen, 4.94) were consistent with the structure:

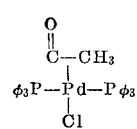

EXAMPLE 3

Phenyl iodide (0.004 mole) in benzene (5 ml.) was added dropwise, with stirring to a suspension of $$[(C_6H_5)_3P]_4Pd$$

(0.002 mole) in degassed benzene (50 ml.). The mixture was stirred for 1 hour at room temperature after which the solvent was removed under vacuum on a Büchi Roto-Vaptor. The solid residue was triturated with ether. The remaining solid was recrystallized from methylene chloride-hexane to give the crystalline product; M.P. 171–186° C. (d.). Infrared and nuclear magnetic resonance spectra and elemental analysis (Found (percent): C, 60.34; H, 4.26; P, 7.52; Pd, 1.57; Halogen, 14.59) were consistent with the structure:

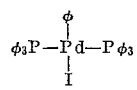

EXAMPLE 4

Methallyl chloride (0.004 mole) in benzene (5 ml.) was added dropwise, with stirring to a suspension of $$[(C_6H_5)_3P]_4Pd$$

(0.002 mole) is degassed benzene (50 ml.). The mixture was stirred for 1 hour at room temperature after which the solvent was removed under vacuum on a Büchi Roto-Vaptor. The solid residue was triturated with ether. The remaining solid was recrystallized from methylene chloride-hexane to give the crystalline product: M.P. 121° C. (d.). Infrared and nuclear magnetic resonance spectra and elemental analysis (Found (percent): C, 65.47; H, 5.41; P, 8.42; Pd, 14.49; Halogen, 5.20) were consistent with the structure:

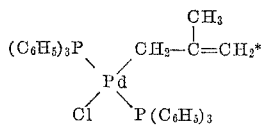

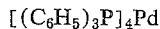

* Rapidly interchanging methallyl group.

Allyl chloride gave the analogous product under the same conditions.

EXAMPLE 5

Cyanogen bromide (0.004 mole) in benzene (5 ml.) was added dropwise with stirring, to a suspension of $[(C_6H_5)_3P]_4Pd$ (0.002 mole) in degassed benzene (50 ml.). The mixture was stirred for 1 hour at room temperature after which the solvent was removed under vacuum on a Büchi Roto-Vaptor. The solid residue was triturated with ether. The remaining solid was recrystallized from methylene chloride-hexane to give the crystalline product; M.P. 232° C. (d.). Infrared spectra and elemental analysis (Found (percent): C, 59.30; H, 4.41; P, 8.12) were consistent with the structure:

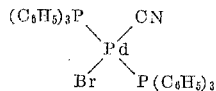

EXAMPLE 6

Ethyl chloroformate (0.004 mole) in benzene (5 ml.) was added dropwise with stirring, to a suspension of $[(C_6H_5)_3P]_4Pd$ (0.002 mole) in degassed benzene (50 ml.). The mixture wa stirred for 1 hour at room temperature after which the solvent was removed under vacuum on a Büchi Roto-Vaptor. The solid residue was triturated with ether. The remaining solid was recrystallized from ethylene chloride-hexane to give the crystalline product; M.P. 176° C. (d.). Infrared and nuclear magnetic resonance spectra and elemental analysis (Found (percent): C, 63.44; H, 4.68; P, 8.42; Pd, 13.80; Halogen, 4.97) were consistent with the structure:

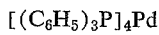

EXAMPLE 7

Addition of excess benzyl chloride to a suspension of $Pd[P(C_6H_5)_3]_4$ in benzene at room temperature gave chloro (benzyl)-bis(triphenylphosphine) palladium(II), [A], in 92% yield. Recrystallization from methylene chloride-hexane gave crystals melting at 147–151° C. (d.) which contain a half mole of methylene chloride of crystallization. Nuclear magnetic resonance spectra (in CDCl$_3$), infrared spectra (Pd-Cl 275 cm.$^{-1}$) and elemental analysis were consistent with the structure [A]:

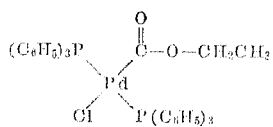

Recrystallization from chloroform-hexane took place with loss of triphenyl phosphine to give the bridged dimer, di-$\mu$ - chlorobis(benzyl)bis(triphenylphosphine)dipalladium (II), [B]

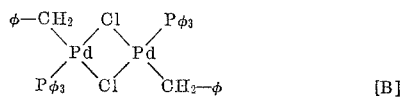

EXAMPLE 8

Bi [bis (1,2-diphenylphino) ethane]palladium (0) (1.25 gram) and acetyl chloride (1.0 gram) in benzene (30 ml.) were refluxed under argon for 4 hours. After cooling, the benzene was removed on a Büchi Roto-Vaptor, and the resulting material was triturated with ether to leave a colorless solid (1.2 gram), which was recrystallized from methylene chloride-hexane to give chloro-(acetyl) [bis (1,2-diphenylphosphino) ethane]-palladium (II) (0.5 gram).

What is claimed is:

1. A method for producing a palladium (II) compound having at least one palladium-carbon bond and at least one palladium-halogen bond comprising reacting a preformed complex containing palladium in the zero valent state and stabilizing monodentate or bidentate ligands of phosphine, phosphite or arsine with a compound having at least one halogen-carbon bond and in which the carbon of said halogen-carbon bond is contained in a radical having less than 50 carbon atoms, said radical being selected from the group consisting of alkyl, cycloalkyl, aryl, aralkyl, alkaryl, acyl, alkenyl wherein the carbon-carbon double bond is separated by at least one carbon from a carbon bearing a reactive halogen, and cyano.

2. The method according to claim 1 wherein the complex is selected from the group consisting of tetrakis(trihydrocarbylphosphine) palladium (0) and bis(trihydrocarbylphosphine) palladium (0).

3. The method according to claim 1 wherein said reaction is carried out in a mutually inert solvent for the reactants.

4. The method according to claim 1 wherein said halogen is selected from the group consisting of iodine, chlorine and bromine.

5. The method according to claim 1 wherein said halogen-carbon bond containing compound is phenyl iodide.

6. The method according to claim 1 wherein said halogen-carbon bond containing compound is methyl iodide.

7. The method according to claim 1 where said halogen-carbon bond containing compound is acetyl chloride.

8. The method according to claim 1 wherein said halogen-carbon bond containing compound is methallyl chloride.

9. The method according to claim 1 wherein said halogen-carbon bond containing compound is cyanogen bromide.

10. The method according to claim 1 wherein said halogen-carbon bond containing compound is ethyl chloroformate.

References Cited

Cook et al., Con. J. Chem. 45 (1967) pp. 301–3.

Coates, Organo Metallic Compounds, John Wiley and Sons, Inc., 1960 (2nd ed.) New York, N.Y., p. 321.

Baird et al., J. Chem. Soc. (A) 1967, pp. 865–6.

TOBIAS E. LEVOW, Primary Examiner

A. P. DEMERS, Assistant Examiner

U.S. Cl. X.R.

252—431 C, 431 N, 431 P, 431 R; 260—93.1, 429 L, 523 R